United States Patent
Kobayashi et al.

(10) Patent No.: US 7,956,488 B2
(45) Date of Patent: Jun. 7, 2011

(54) POWER SUPPLY CONTROLLING APPARATUS FOR MOTOR VEHICLE

(75) Inventors: Nobuaki Kobayashi, Shioya (JP); Seiji Kamata, Shioya (JP)

(73) Assignee: Keihin Corporation, Tokyo (JP)

( * ) Notice: Subject to any disclaimer, the term of this patent is extended or adjusted under 35 U.S.C. 154(b) by 202 days.

(21) Appl. No.: 12/469,133

(22) Filed: May 20, 2009

(65) Prior Publication Data

US 2009/0295224 A1    Dec. 3, 2009

(30) Foreign Application Priority Data

May 27, 2008   (JP) .................. 2008-137644

(51) Int. Cl.
*B60L 1/00* (2006.01)
(52) U.S. Cl. ........................................ 307/9.1
(58) Field of Classification Search .............. 307/9.1
See application file for complete search history.

(56) References Cited

U.S. PATENT DOCUMENTS
5,994,789 A * 11/1999 Ochiai .................. 307/10.1

FOREIGN PATENT DOCUMENTS
JP     9-56167 A    2/1997
JP   2006-304408 A   11/2006

* cited by examiner

*Primary Examiner* — Robert L. Deberandinis
(74) *Attorney, Agent, or Firm* — Westerman, Hattori, Daniels & Adrian, LLP

(57) ABSTRACT

A controlling apparatus for a motor vehicle has a high voltage direct current (dc) power supply, an inverter for converting dc power of the high voltage dc power supply into ac power, a smoothing capacitor provided between the inverter and the high voltage dc power supply, a main contactor provided between the high voltage dc power supply and the smoothing capacitor for connecting and disconnecting the high voltage dc power supply and the smoothing capacitor to and from each other, and a precharge circuit connected in parallel to the main contactor.

2 Claims, 11 Drawing Sheets

POWER SUPPLY CONTROLLING APPARATUS FOR MOTOR VEHICLE

BACKGROUND OF THE INVENTION

1. Field of the Invention

This invention relates to a controlling apparatus for a motor vehicle having a high voltage direct current (dc) power supply, an inverter for converting dc power of the high voltage dc power supply into ac power, a smoothing capacitor provided between the inverter and the high voltage dc power supply, a main contactor provided between the high voltage dc power supply and the smoothing capacitor for connecting and disconnecting the high voltage dc power supply and the smoothing capacitor to and from each other, and a precharge circuit connected in parallel to the main contactor.

2. Description of the Related Art

In motor vehicles such as a hybrid vehicle, a fuel cell vehicle and an electric automobile, driving force is generated by a generator-motor (hereinafter referred to as electric motor or motor) and transmitted to an axle. In order to obtain optimum driving force in response to a traveling state of the vehicle, a voltage of a high voltage battery (high voltage dc power supply) is subjected to direct current/three-phase alternating current conversion by an inverter to obtain driving force of the motor. Further, kinetic energy transmitted from the axle to the electric motor is converted into electric energy, subjected to three-phase alternating current/direct current conversion by the inverter and regenerates the direct current to the high voltage battery. In order to connect and disconnect the high voltage battery and the inverter to and from each other, a main contactor of a mechanical relay is provided. Further, a smoothing contactor is provided in order to smooth the primary power supply and suppress a surge voltage to protect the device.

When an ignition switch is switched ON, if the main contactor is switched ON to charge the smoothing capacitor, then the smoothing capacitor is damaged by rush current, and therefore, in order to prevent the damage and prevent adhesion of the main contactor, the smoothing capacitor is precharged.

Further, if the main contactor is ON when a great potential difference appears between the smoothing capacitor and the high voltage battery upon regeneration, then an over-voltage is applied to the high voltage battery and the life of the high voltage is shortened, and therefore, the main contactor is switched OFF to allow discharge from the smoothing capacitor to the high voltage battery through the pre-charge circuit.

Therefore, bidirectional energization for charge from the high voltage battery to the smoothing capacitor and discharge from the smoothing capacitor to the high voltage battery is demanded for the pre-charge circuit. Conventionally, Japanese Patent Laid-Open No. Hei 09-056167 and Japanese Patent Laid-Open No. 2006-304408 are available as prior art documents relating to precharge of a smoothing capacitor.

It is disclosed in Japanese Patent Laid-Open No. Hei 09-056167 that, before a main contactor 3 is switched on, a precharge contactor 5 is switched on to precharge a smoothing capacitor 6 from a high voltage battery 1 through a current limiting element (resistor) 4 and the mechanical precharge contactor 5.

It is disclosed in Japanese Patent Laid-Open No. 2006-304408 that a precharge circuit is formed from a system main relay SMR1 formed from a semiconductor relay of the FET (field-effect transistor) type and a limiting resistor R to carry out precharge and, upon regeneration, a high voltage is charged from a smoothing capacitor C by another system main relay SMR2.

However, in Japanese Patent Laid-Open Hei 09-056167, there is a problem that the cost is high because the precharge contactor is a mechanical relay. Further, there is another problem that, since a precharge resistor is externally connected, the circuit scale is increased.

Meanwhile, in Japanese Patent Laid-Open No. 2006-304408, although a system main relay of the FET type is used only for the precharge from the high voltage battery to the smoothing capacitor, it is necessary to allow bidirectional energization in order to discharge from the smoothing capacitor to the high voltage battery as described above. Where the bidirectional energization is carried out by a semiconductor switch of the FET type, a semiconductor relay is required individually for charge from the high voltage battery to the smoothing capacitor and discharge from the smoothing capacitor to the high voltage battery, and there is a problem that the cost becomes high.

SUMMARY OF THE INVENTION

The present invention has been made in view of the problems described above, and it is an object of the present invention to provide an electric precharge circuit which can carry out bidirectional energization for charge from a high voltage battery to a smoothing capacitor and discharge from the smoothing capacitor to the high voltage battery using a common switch element to reduce the cost. It is another object of the present invention to provide an electric precharge circuit which can achieve a protection function even where one of common switches suffers from a failure in an ON state.

In accordance with an aspect of the first present invention, there is provided a controlling apparatus for a motor vehicle having a high voltage dc power supply, an inverter for converting dc power of the high voltage dc power supply into ac power, a smoothing capacitor provided between the inverter and the high voltage dc power supply, a main contactor provided between the high voltage dc power supply and the smoothing capacitor for connecting and disconnecting the high voltage dc power supply and the smoothing capacitor to and from each other, and a precharge circuit connected in parallel to the main contactor, the precharge circuit including a discharge path connected in parallel to the main contactor for passing discharge current from the smoothing capacitor to the high voltage dc power supply from the negative electrode of the high voltage dc power supply to the negative electrode of the smoothing capacitor or from the positive electrode of the smoothing capacitor to the positive electrode of the high voltage dc power supply and a charge path connected in parallel to the main contactor for passing charge current from the high voltage do power supply to the smoothing capacitor from the negative electrode of the smoothing capacitor to the negative electrode of the high voltage dc power supply or from the positive electrode of the high voltage dc power supply to the positive electrode of the smoothing capacitor, at least one common switch element being provided in the discharge path and the charge path.

Since the discharge current from the smoothing capacitor to the high voltage dc power supply is passed from the negative electrode of the high voltage dc power supply to the negative electrode of the smoothing capacitor or from the positive electrode of the smoothing capacitor to the positive electrode of the high voltage dc power supply by the discharge path and the charge current from the high voltage dc power supply to the smoothing capacitor is passed from the negative electrode of the smoothing capacitor to the negative electrode of the high voltage do power supply or from the positive electrode of the high voltage do power supply to the positive electrode of the smoothing capacitor by the charge path while the discharge path and the charge path include the common switch element for passing the discharge current and the charge current, respectively, the discharge current and the charge current to flow in the opposite directions can be passed using the at least one switch element, and the cost can be reduced.

Further, since the directions of the discharge current and the charge current flowing through the common switch element are same as each other, the common switch element may have a voltage withstanding property for one direction, and the cost can be reduced. Furthermore, where a plurality of common switch elements are disposed in the charge path and the discharge path, even if one of the common switch elements is brought into an ON failure state, the charge and discharge paths can be turned ON/OFF using a normal one of the common switch elements. Consequently, a protection function in an ON failure state can be achieved.

According to the second present invention, there is provided a controlling apparatus for a motor vehicle wherein a first diode electrically connected to one terminal of the main contactor for passing the discharge current and a fourth diode electrically connected to the other terminal of the main contactor for passing the discharge current are provided in the discharge path, and a second diode electrically connected to the other terminal of the main contactor for passing the charge current and a third diode electrically connected to the one terminal of the main contactor for passing the charge current are provided in the charge path, the at least one common switch element being disposed between the first and fourth diodes and between the second and third diodes.

Since the first diode and the fourth diode are provided in the discharge path while the second diode and the third diode are provided in the charge path and the at least one common switch element is disposed between the first and fourth diodes and between the second and third diodes, the electron precharge circuit can be configured from inexpensive parts.

The above and other objects, features and advantages of the present invention and the manner of realizing them will become more apparent, and the invention itself will best be understood, from a study of the following description and the appended claims with reference to the attached drawings showing some preferred embodiments of the invention.

DETAILED DESCRIPTION OF THE PREFERRED EMBODIMENTS

First Embodiment

Figure 1:
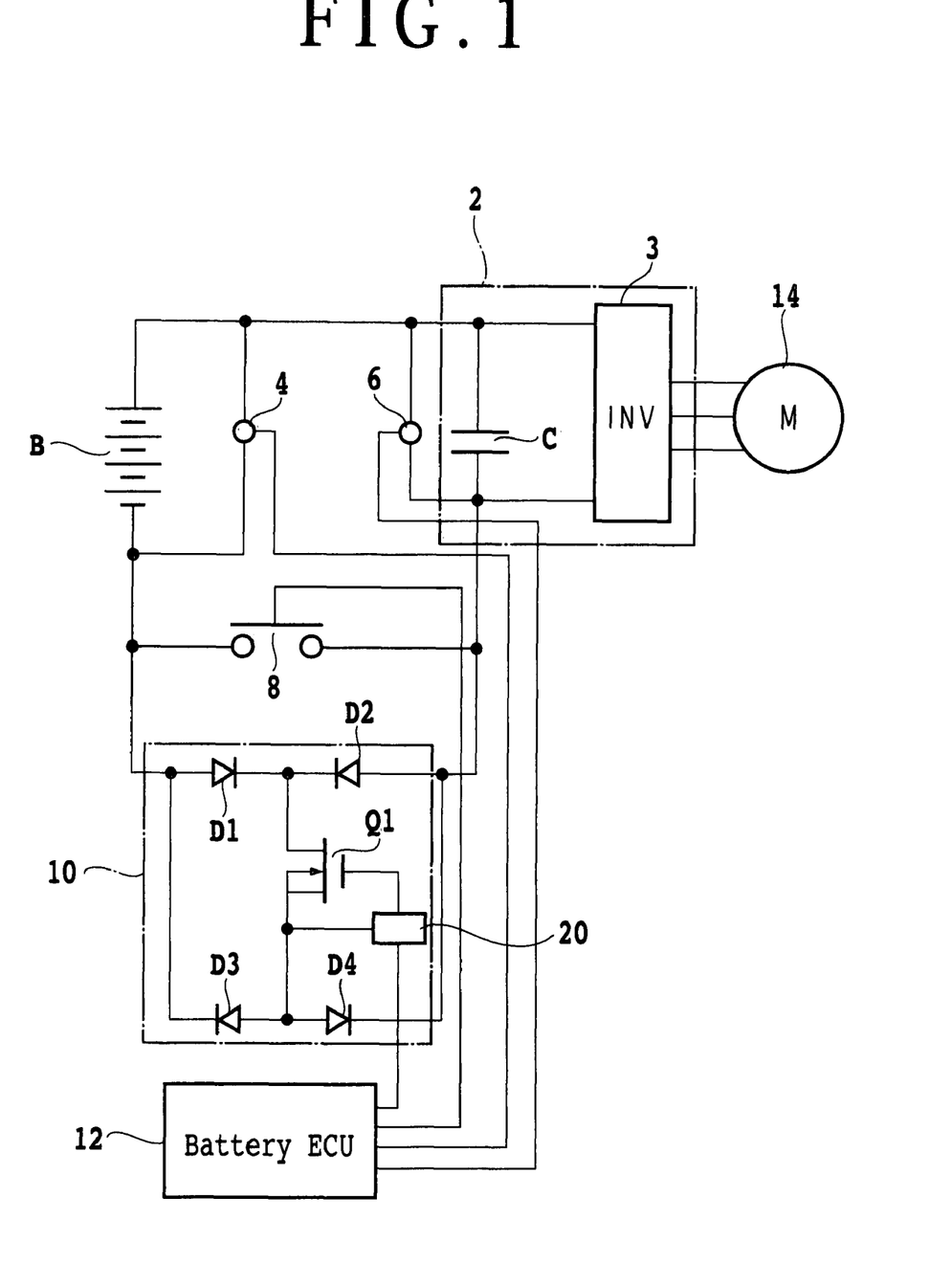
FIG. 1 is a block circuit diagram of a controlling apparatus for a motor vehicle according to a first embodiment of the present invention.

FIG. 1 is a block circuit diagram of a controlling apparatus for a motor vehicle such as a hybrid vehicle, an electric automobile or a fuel cell vehicle in which a high voltage battery is incorporated according to a first embodiment of the present invention. As shown in FIG. 1, the controlling apparatus for a motor vehicle includes a high voltage battery B, a PDU (power drive unit) 2, a battery voltage sensor 4, a smoothing capacitor voltage sensor 6, a main contactor 8, an electron precharge circuit 10, a battery ECU 12, and a motor 14 as well as a battery current sensor, a thermistor, a fuse and a breaker not shown.

The high voltage battery (high voltage dc power supply) B is an accumulator apparatus for supplying electric power to the motor 14 through an inverter 3 and is a lithium-ion battery, a nickel-hydrogen battery or the like, and a plurality of battery blocks wherein a plurality of electric cells are formed as a module are connected in series.

The PDU 2 has a smoothing capacitor C and the inverter 3. The smoothing capacitor C is a capacitor for smoothing an output voltage from the high voltage battery B or the inverter 3 in order to smooth the primary power supply and suppress the surge voltage. The smoothing capacitor C is connected at the positive electrode thereof to the positive electrode of the high voltage battery B and at the negative electrode thereof the other contact of the main contactor 8 and the electron precharge circuit 10.

The inverter 3 converts, upon driving of the motor 14 (upon assisting by the motor 14), the voltage from the high voltage battery B into a three-phase alternating voltage under the PWM control of ON/OFF of a switch element not shown by a motor ECU not shown and outputs the three-phase alternating voltage to the motor 14. On the other hand, upon regeneration of the motor 14, the inverter 3 converts a three-phase alternating voltage generated by the motor 14 into a dc voltage under the control of the motor ECU.

The battery voltage sensor 4 detects a voltage of the high voltage battery B and outputs a detection signal to the battery ECU 12. The smoothing capacitor voltage sensor 6 detects a voltage of the smoothing capacitor C and outputs a detection signal to the battery ECU 12. The main contactor 8 is formed from a relay having an a-contact configuration for mechanically turning the connection between the negative electrode of the high voltage battery B and the negative electrode of the smoothing capacitor C ON/OFF, and carries out or interrupts supply of power between the high voltage battery B and the PDU 2. The main contactor 8 is connected at one of contacts thereof to the negative electrode of the high voltage battery B and at the other contact thereof to the negative electrode of the smoothing capacitor C and the electron precharge circuit 10.

The electron precharge circuit 10 is a circuit for carrying out precharge from the high voltage battery B to the smoothing capacitor C and discharge from the smoothing capacitor C to the high voltage battery B and is connected in parallel to the main contactor 8. The electron precharge circuit 10 includes a first diode D1, a second diode D2, a third diode D3, a fourth diode D4, an FET Q1 and a gate circuit 20.

The first diode D1 is a switch for passing, upon discharge from the smoothing capacitor C to the high voltage battery B, discharge current in one direction from the negative electrode of the high voltage battery B to the negative electrode of the smoothing capacitor C. The first diode D1 is electrically connected at the anode thereof to the negative electrode of the high voltage battery B, the cathode of the third diode D3 and the one contact of the main contactor 8, and is electrically connected at the cathode thereof to the cathode of the second diode D2 and a first electrode (drain) of the FET Q1. Here, that something is electrically connected signifies that something is connected directly or that something is connected through a resistor.

The second diode D2 is a switch for passing, upon charge from the high voltage battery B to the smoothing capacitor C, charge current in one direction from the negative electrode of the smoothing capacitor C to the negative electrode of the high voltage battery B. The second diode D2 is electrically connected at the anode thereof to the negative electrode of the smoothing capacitor C, the cathode of the fourth diode D4 and the other contact of the main contactor 8 and is electrically connected at the cathode thereof to the cathode of the first diode D1 and the drain of the FET Q1.

The third diode D3 is a switch for passing, upon charge from the high voltage battery B to the smoothing capacitor C, charge current in one direction from the negative electrode of the smoothing capacitor C to the negative electrode of the high voltage battery B. The third diode D3 is electrically connected at the anode thereof to a second electrode (source) of the FET Q1, the anode of the fourth diode D4 and the gate circuit 20 and is electrically connected at the cathode thereof to the negative electrode of the high voltage battery B, the anode of the first diode D1 and the one contact of the main contactor 8.

The fourth diode D4 is a switch for passing, upon discharge from the smoothing capacitor C to the high voltage battery B, discharge current in one direction from the negative electrode of the high voltage battery B to the negative electrode of the smoothing capacitor C. The fourth diode D4 is electrically connected at the anode thereof to the source of the FET Q1, the anode of the third diode D3 and the gate circuit 20 and is electrically connected at the cathode thereof to the anode of the second diode D2, the negative electrode of the smoothing capacitor C and the other contact of the main contactor 8.

The FET (common switch element) Q1 is an n-channel field effect transistor which has a control electrode (gate), a first electrode (drain) and a second electrode (source), the continuity between the first and second electrodes is controlled with a control signal applied to the control electrode. The FET Q1 is electrically connected at the drain thereof to the cathodes of the first and second diodes D1 and D2 and electrically connected at the source thereof to the anodes of the third and fourth diodes D3 and D4.

The first diode D1, FET Q1 and fourth diode D4 form a discharge path for passing discharge current for discharge from the smoothing capacitor C to the high voltage battery B from the negative electrode of the high voltage battery B to the negative electrode of the smoothing capacitor C. The second diode D2, FET Q1 and third diode D3 form a charge path for passing charge current for charge from the high voltage battery B to the smoothing capacitor C from the negative electrode of the smoothing capacitor C to the negative electrode of the high voltage battery B.

The gate circuit 20 is a constant current circuit, for example, a constant current circuit of a source follower, for controlling the FET Q1 ON/OFF and controlling charge/discharge current in accordance with a control signal from the battery ECU 12. Since the potential at the anodes of the third and fourth diodes D3 and D4 with which they are turned ON is a lower one of potentials at the negative electrode of the high voltage battery B and the negative electrode of the smoothing capacitor C, the gate circuit 20 is formed, for example, in such a manner as described below.

In the gate circuit 20, a first resistor, a Zener diode connected at the cathode thereof to the gate of the FET Q1 and connected at the anode thereof to the anodes of the third and fourth diodes D3 and D4, a switch formed from a transistor or the like and a second resistor are provided in parallel between the anodes of the third and fourth diodes D3 and D4 and the gate of the FET Q1.

A dc voltage (the negative electrode of the high voltage battery B is grounded) is applied to the first resistor and the Zener diode through the switch and the second electrode to clamp the Zener diode to a fixed voltage, or the dc voltage is shifted by a fixed voltage level from the voltage at the anode of the third and fourth diodes D3 and D4 by the first resistor and applied to the gate. A resistor is provided between the source of the FET Q1 and the anodes of the third and fourth diodes D3 and D4 to adjust the charge/discharge current.

Turning ON/OFF of the FET Q1 is controlled in accordance with a control signal from the battery ECU 12 based on switching ON/OFF of the switch. The charge/discharge current is suppressed, for example, to approximately several amperes by the gate circuit 20, and therefore, damage to the smoothing capacitor C by rush current can be prevented and the life of the high voltage battery B can be prevented from being shortened.

Since the FET Q1 is provided between the first diode D1 and the fourth diode D4, discharge current upon discharge from the smoothing capacitor C to the high voltage battery B flows from the first diode D1 to the fourth diode D4 through the FET Q1. When the potential at the negative electrode of the high voltage battery B is higher than the voltage of the negative electrode of the smoothing capacitor C and discharge current flows, the second and third diodes D2 and D3 are reversely biased, and therefore, a reverse bias resisting property is provided in accordance with a potential difference between the potential at the negative electrode of the high voltage battery B and the potential at the negative electrode of the smoothing capacitor C.

Since the FET Q1 is provided between the second diode D2 and the third diode D3, charge current upon charge from the high voltage battery B to the smoothing capacitor C flows from the second diode D2 to the third diode D3 through the FET Q1. When the potential at the negative electrode of the smoothing capacitor C is higher than the potential at the negative electrode of the high voltage battery B and charge current flows, the first and fourth diodes D1 and D4 are reversely biased. Therefore, a reverse bias resisting property is provided in accordance with a voltage difference between the potential at the negative electrode of the smoothing capacitor C and the potential at the negative electrode of the high voltage battery B.

Since the FET Q1 is electrically connected at the drain thereof to the cathodes of the first diode D1 and the second diode D2, discharge or charge current flows from one of the first and second diodes D1 and D2 which is in an ON state flows into the drain of the FET Q1. The FET Q1 is electrically connected at the source thereof to the anodes of the third and fourth diodes D3 and D4, and discharge or charge current flows out from the source of the FET Q1 to one of the third and fourth diodes D3 and D4 which is in an ON state. In this manner, in the FET Q1, the direction in which discharge and charge current flows upon discharge and charge is fixed.

Therefore, the FET Q1 may have a one-directional voltage withstanding property and can be formed from a less expensive FET.

If a semiconductor switch is provided between the first diode D1 and the fourth diode D4 and between the second diode D2 and the third diode D3 and causes discharge and charge current to flow in one direction, then the semiconductor switch is not limited to the FET Q1, but some other switch element such as a transistor may be used. Further, the first and fourth diodes D1 and D4 may be some other switch elements.

The battery ECU 12 carries out control of precharge from the high voltage battery B to the smoothing capacitor C by switching ON the FET Q1 in response to switching ON of an ignition switch IG_SW not shown, control of discharge from the smoothing capacitor C to the high voltage battery B by turning ON the FET Q1 when the voltage of the smoothing capacitor C outputted from the smoothing capacitor voltage sensor 6 is higher by a prescribed voltage than the voltage of the high voltage battery B outputted from the battery voltage sensor 4, and monitoring and control of the high voltage battery B based on a sensor output of a battery current sensor or the like.

The motor 14 is connected at an output power shaft thereof, in a hybrid vehicle, to a crankshaft of an engine not shown, and, for example, a three-phase brushless motor is used for the motor 14. Upon driving, the motor 14 is supplied with alternating electric power, for example, with three-phase alternating electric power, from the inverter 3 and operates as an electric motor, and the electric motor is operated to carry out starting of the engine or assist the driving power of the engine. Further, the motor 14 converts kinetic energy transmitted thereto from the axle into electric energy, and the electric energy is converted by three-phase alternating current/dc current by the inverter 3 and regenerated to the high voltage battery.

Figure 2:
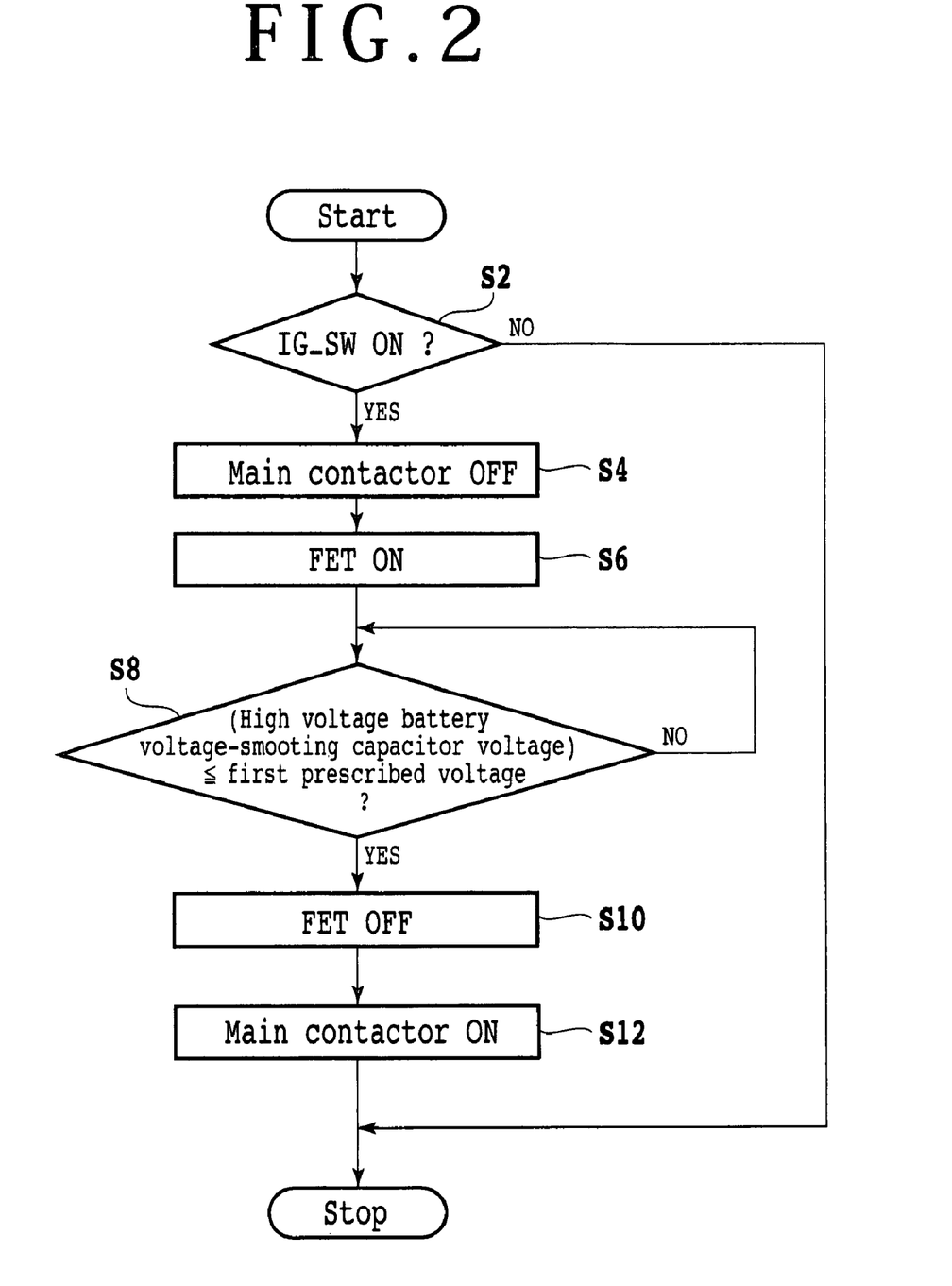
FIG. 2 is a flow chart of precharge.
Figure 3:
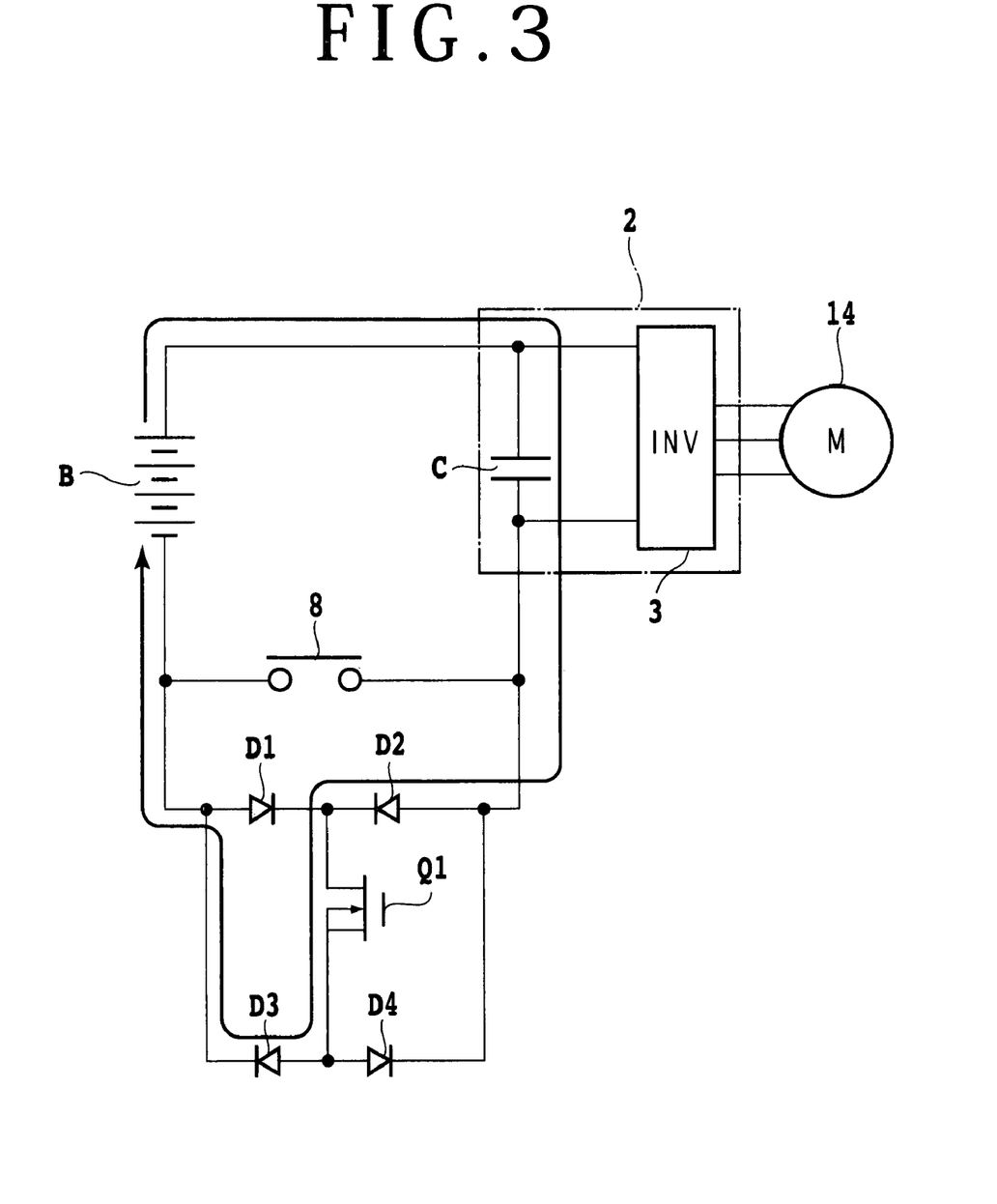
FIG. 3 is a view showing a current path in the precharge.
Figure 4:
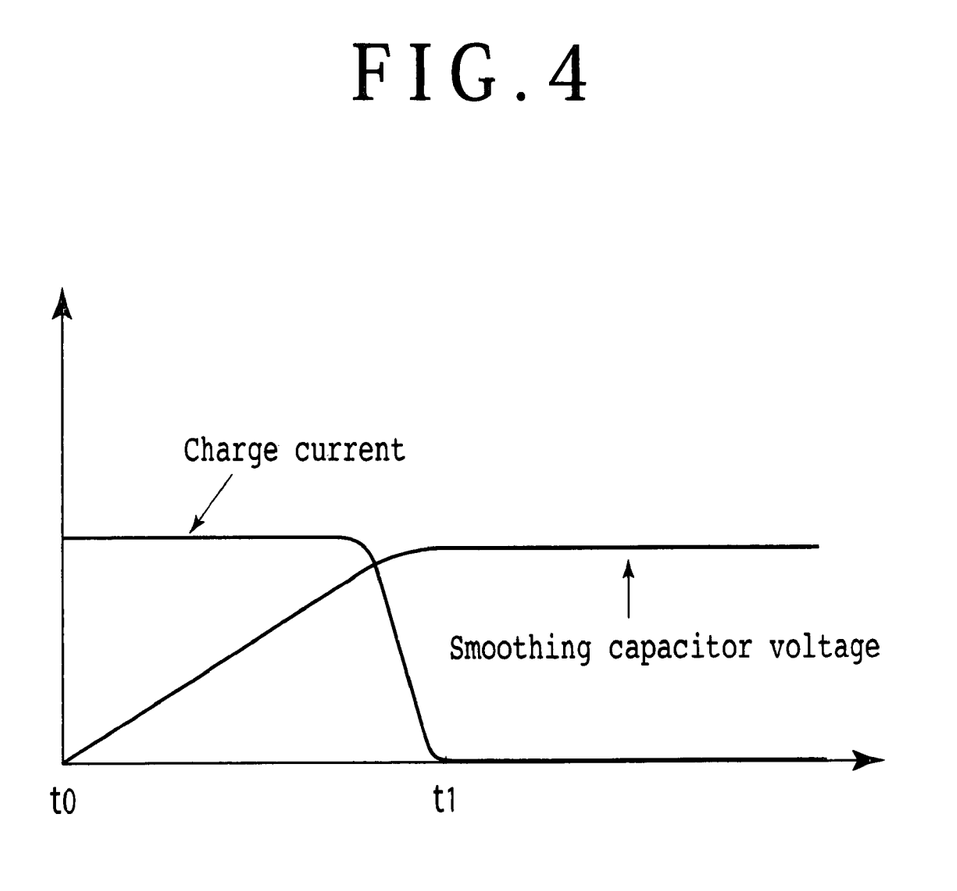
FIG. 4 is a time chart of the precharge.

FIG. 2 is a flow chart of precharge from the high voltage battery B to the smoothing capacitor C. FIG. 3 is a view showing a current path of charge current upon precharge. FIG. 4 is a timing chart upon precharge. In the following, a precharge method from the high voltage battery B to the smoothing capacitor C is described with reference to the figures.

It is decided at step S2 whether or not the ignition switch IG_SW not shown is switched ON. If the decision is in the affirmative, then the processing advances to step S4. If the decision is in the negative, then the processing is ended. It is assumed that the ignition switch IG_SW is switched on, for example, at time t0 in FIG. 4. At step S4, the main contactor 8 is turned OFF. At step S6, the FET Q1 is turned ON.

Since the potential at the negative electrode of the smoothing capacitor C is higher than the potential at the negative electrode of the high voltage battery B, the second and third diodes D2 and D3 are forwardly biased and turned ON, and charge current flows along the path of the positive electrode of the high voltage battery B→positive electrode of the smoothing capacitor C→negative electrode of the smoothing capacitor C→second diode D2→FET Q1→third diode D3→negative electrode of the high voltage battery B as seen in FIG. 3 to charge the smoothing capacitor C. At this time, since the charge current flowing from the gate circuit 20 to the FET Q1 is suppressed to approximately several amperes as seen in FIG. 4, rush current does not flow to the smoothing capacitor C, and the smoothing capacitor C can be protected.

At step S8, it is decided whether or not the voltage difference between the voltage of the high voltage battery B and the voltage of the smoothing capacitor C is lower than a first prescribed voltage, for example, whether or not the voltage of the smoothing capacitor C is equal to the voltage of the high voltage battery B. If the decision is in the affirmative, then since the precharge ends, the processing advances to step S10. For example, the precharge ends at time t1. If the decision is in the negative, then since the precharge does not end, the precharge is continued until the voltage of the smoothing capacitor C becomes higher than the first prescribed voltage at step S8. At step S10, the FET Q1 is turned OFF. At step S12, the main contactor 8 is turned ON.

Figure 5:
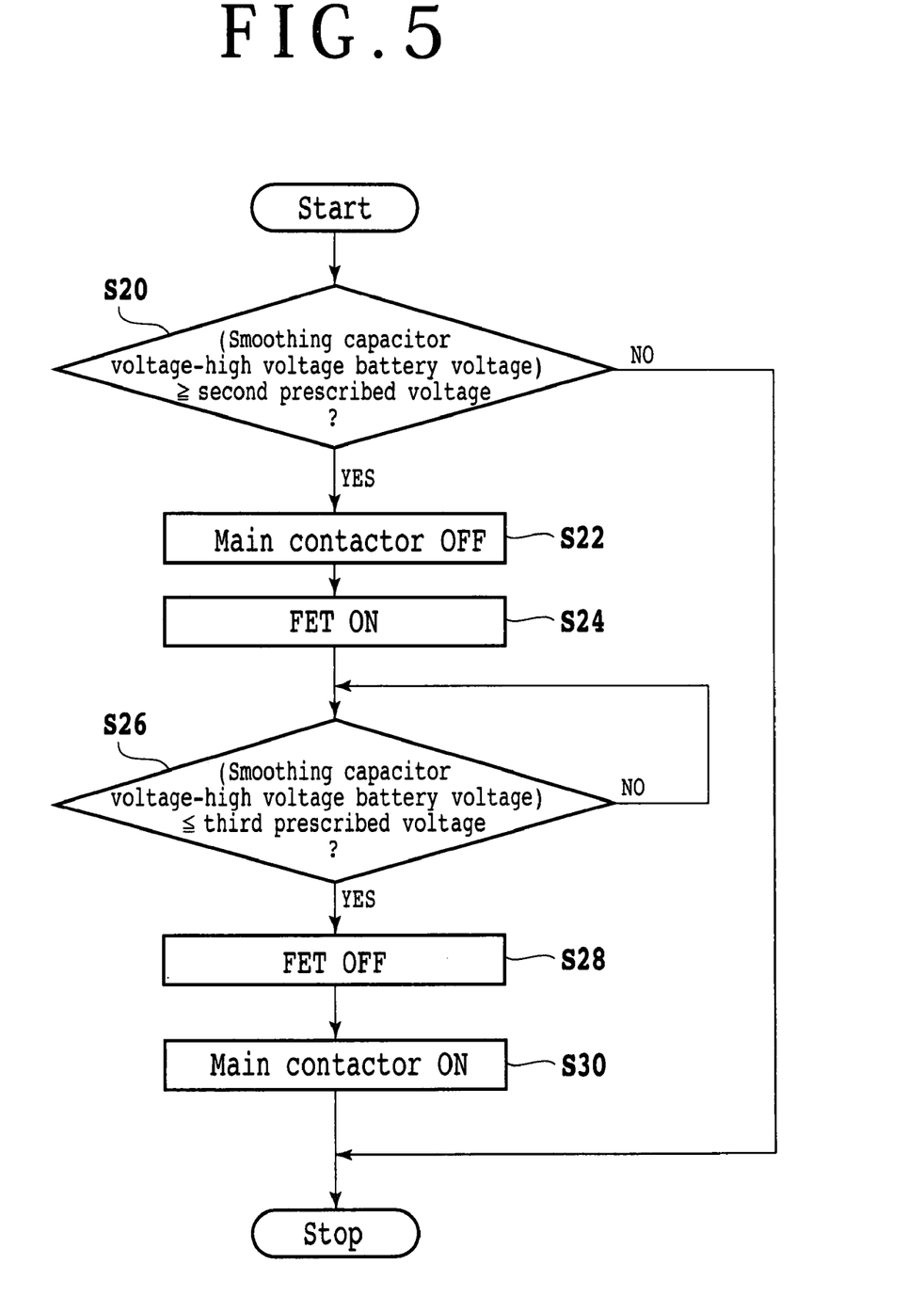
FIG. 5 is a flow chart of discharge.
Figure 6:
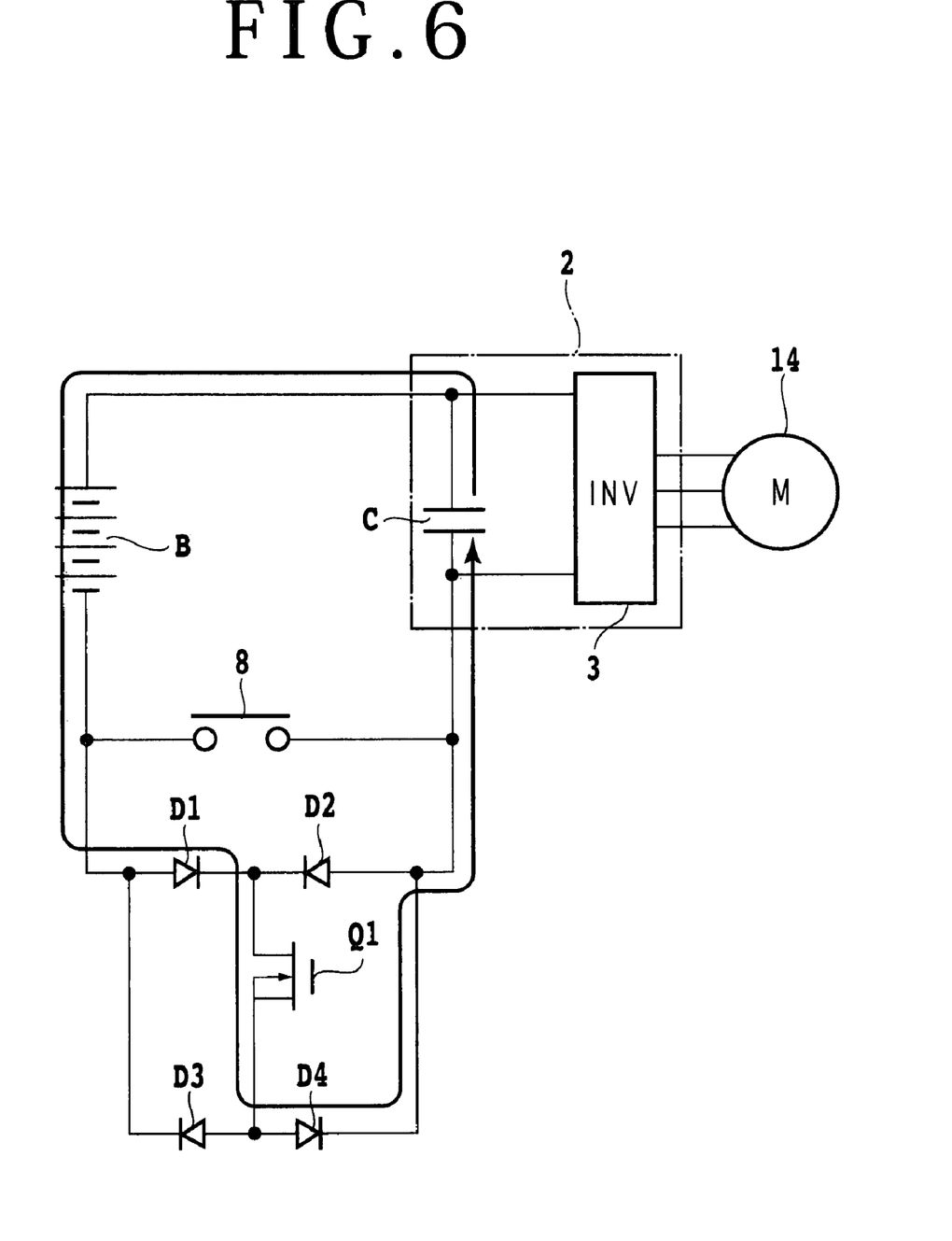
FIG. 6 is a view showing a current path in the discharge.
Figure 7:
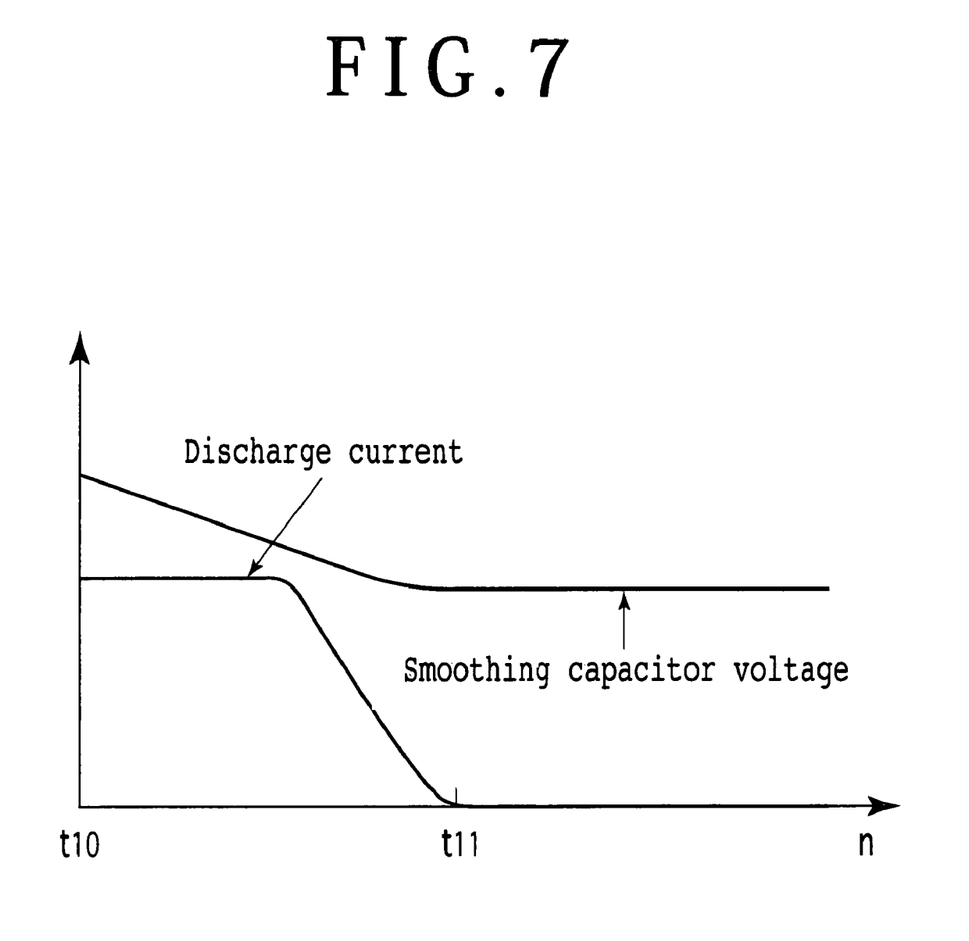
FIG. 7 is a time chart of the discharge.

FIG. 5 is a flow chart of discharge from the smoothing capacitor C to the high voltage battery B. FIG. 6 is a view showing a current path of discharge current upon discharge. FIG. 7 is a time chart upon discharge. In the following, a discharge method from the smoothing capacitor C to the high voltage battery B is described with reference to the figures.

At step S20, it is decided whether or not the voltage of the smoothing capacitor C is higher by a second prescribed voltage than the voltage of the high voltage battery B. If the decision is in the affirmative, then the processing advances to step S22. If the decision is in the negative, then the processing is ended. At step S22, the main contactor 8 is turned OFF. At step S24, the FET Q1 is turned ON. It is assumed that the FET Q1 is turned ON, for example, at time t10 in FIG. 6.

Since the voltage of the smoothing capacitor C is higher than the voltage of the high voltage battery B and the potential at the negative electrode of the smoothing capacitor C is lower than the potential at the negative electrode of the high voltage battery B, the first and fourth diodes D1 and D4 are forwardly biased and turned ON. Consequently, discharge current flows along the path of the positive electrode of the smoothing capacitor C→positive electrode of the high voltage battery B→negative electrode of the high voltage battery B→first diode D1→FET Q1→fourth diode D4→negative electrode of the smoothing capacitor C, and charge of the smoothing capacitor C is discharged to the high voltage battery B.

At this time, since the current flowing from the gate circuit 20 to the FET Q1 is suppressed to approximately several amperes as seen in FIG. 7, rush current does not flow from the smoothing capacitor C to the high voltage battery B, and the high voltage battery B can be protected. Further, since the main contactor 8 is OFF, prevention of adhesion of the main contactor 8 and protection of the high voltage battery B can be anticipated.

At step S26, it is decided whether or not the (voltage of the smoothing capacitor C−voltage of the high voltage battery B) is lower than a third prescribed voltage, that is, whether or not the voltage of the smoothing capacitor C is equal to the voltage of the high voltage battery B. If the decision is in the affirmative, then since the discharge ends, the processing advances to step S28. If the decision is in the negative, since the discharge does not end, the discharge is continued until the (voltage of the smoothing capacitor C−voltage of the high voltage battery B) becomes lower than the third prescribed voltage at step S26. At step S28, the FET Q1 is turned OFF. The FET Q1 is turned OFF, for example, at time t11. At step S30, the main contactor 8 is turned ON.

With the first embodiment described above, since bidirectional energization of charge and discharge is carried out by the first and fourth diodes D1 to D4 and the single FET Q1, the cost decreases and the circuit scale decreases in comparison with an alternative case wherein a precharge resistor and a precharge contactor are used or another alternative case wherein two FETs are provided to carry out energization. Further, since the charge and discharge current flowing through the FET Q1 is limited to one direction, the FET Q1 may have a voltage resisting property in only one direction, and the cost can be reduced.

Second Embodiment

Figure 8:
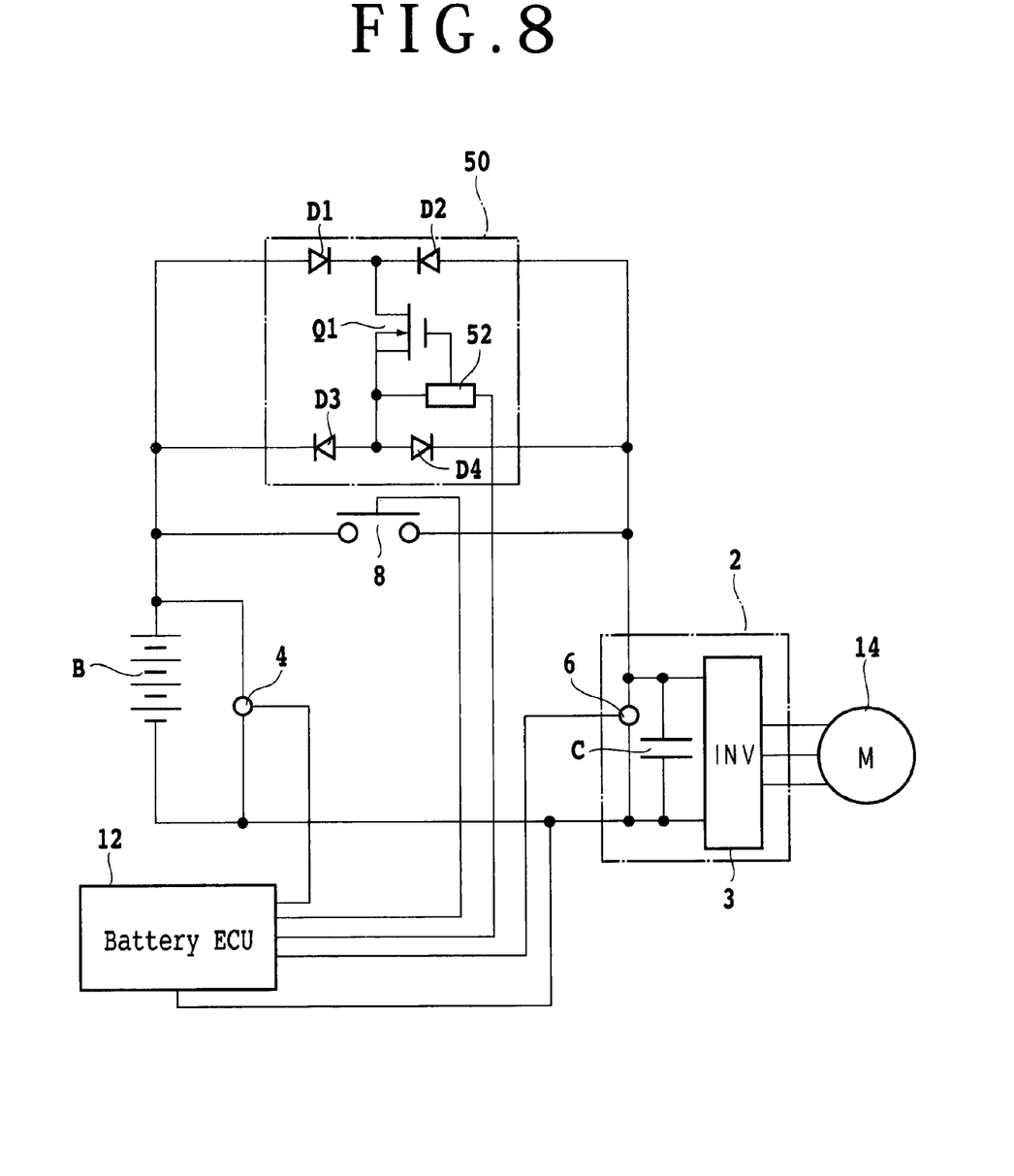
FIG. 8 is a block circuit diagram of a controlling apparatus for a motor vehicle according to a second embodiment of the present invention.

FIG. 8 is a block circuit diagram of a controlling apparatus for a motor vehicle such as a hybrid vehicle, an electric automobile or a fuel cell vehicle wherein a high voltage battery is incorporated according to a second embodiment of the present invention, and components substantially same as those in FIG. 1 are denoted by same reference symbols. The present embodiment is different from the first embodiment in that the main contactor 8 and an electron precharge circuit 50 are provided between the positive electrode of the high voltage battery B and the positive electrode of the smoothing capacitor C.

A gate circuit 52 is a constant current circuit similar to the gate circuit 20, and since it is necessary to drive the FET Q1 with one of the potential at the positive electrode of the high voltage battery B and the potential at the positive electrode of the smoothing capacitor C, the gate circuit 52 level shifts the potential at the anode of the third diode D3 and the anode of the fourth diode D4 by means of a resistor or Zener diode and applies the level shifted potential to the gate of the FET Q1.

The configuration of the electron precharge circuit 50 is substantially same as that of the electron precharge circuit 10 shown in FIG. 1. The second diode D2, FET Q1 and third diode D3 form a discharge path for passing discharge current for discharge from the smoothing capacitor C to the high voltage battery B. The first diode D1, FET Q1 and fourth diode D4 form a charge circuit for passing charge current for charge from the high voltage battery B to the smoothing capacitor C.

Figure 9:
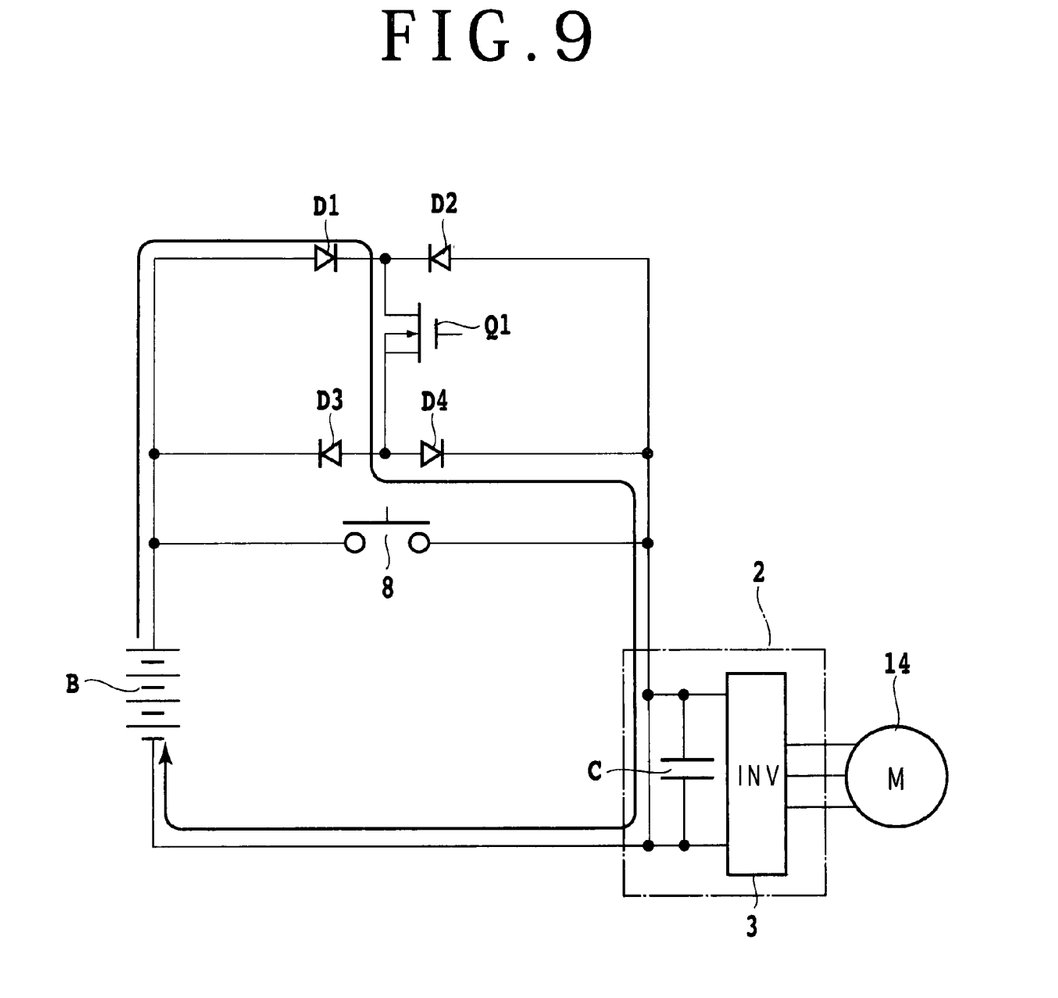
FIG. 9 is a view showing a flow of current in precharge.

FIG. 9 shows a flow of charge current upon precharge. Since an operation flow upon precharge is similar to that in the first embodiment, only the current path upon precharge is described. When the FET Q1 is turned ON, since the potential at the positive electrode of the high voltage battery B is higher than the potential at the positive electrode of the smoothing capacitor C, the first and fourth diodes D1 and D4 are biased forwardly and turned on, and charge current flows along the path of the positive electrode of the high voltage battery B→first diode D1→FET Q1→fourth diode D4→positive electrode of the smoothing capacitor C→negative electrode of the smoothing capacitor C→negative electrode of the high voltage battery B to precharge the smoothing capacitor C. At this time, since the current flowing from the gate circuit 52 to the FET Q1 is suppressed to approximately several amperes, rush current does not flow to the smoothing capacitor C, and the smoothing capacitor C can be protected.

Figure 10:
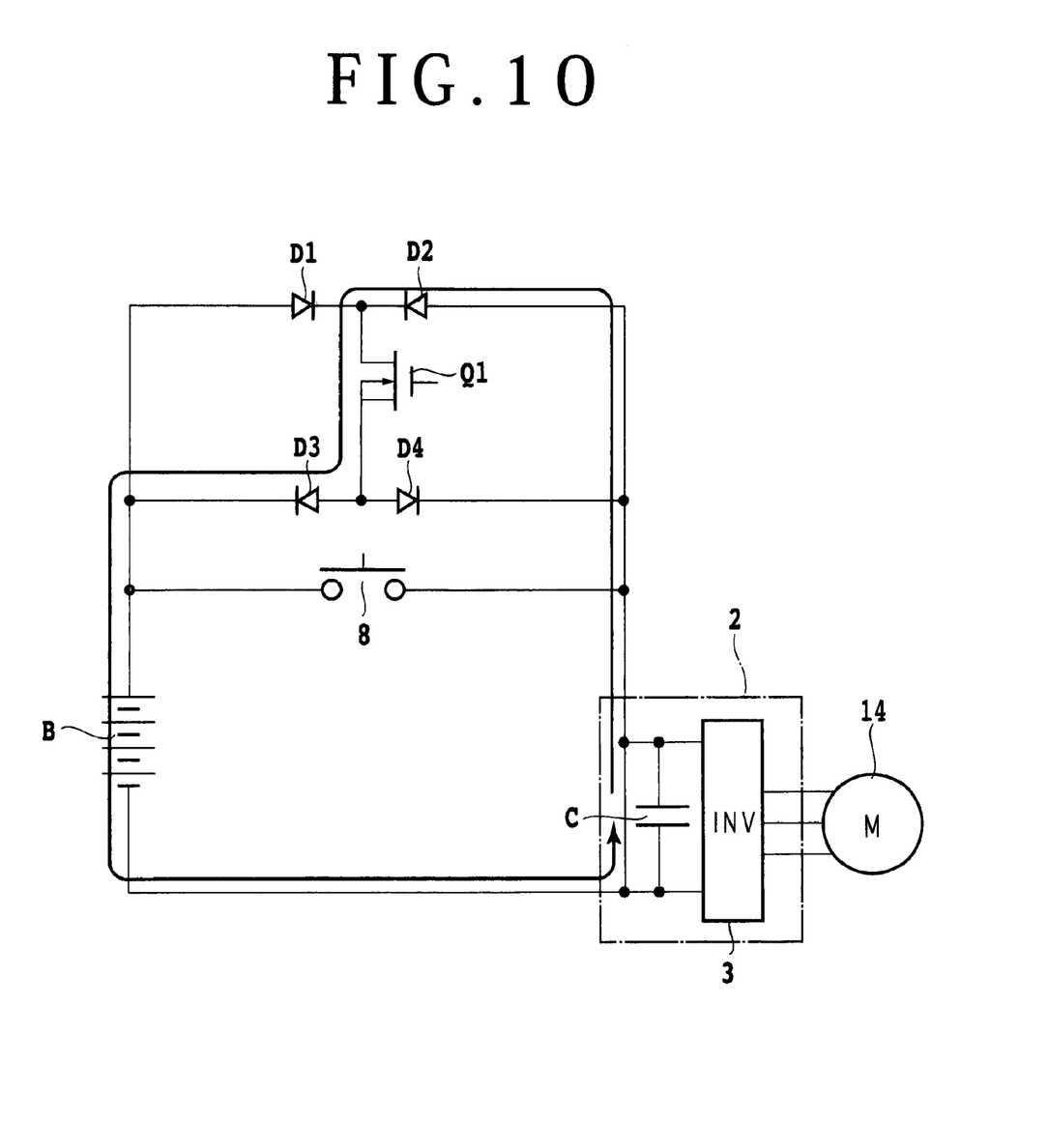
FIG. 10 is a view showing a flow of current in discharge.

FIG. 10 is a view illustrating a flow of charge current. Since an operation flow upon discharge is similar to that in the first embodiment, only the current path upon discharge is described. When the FET Q1 is turned ON, since the potential at the positive electrode of the smoothing capacitor C upon discharge is higher than the potential at the positive electrode of the high voltage battery B, the second and third diodes D2 and D3 are biased forwardly and turned ON, and discharge current flows along the path of the positive electrode of the smoothing capacitor C→second diode D2→FET Q1→third diode D3→positive electrode of the high voltage battery B→negative electrode of the high voltage battery B→negative electrode of the smoothing capacitor C to charge the high voltage battery B. At this time, since the current flowing to the FET Q1 is suppressed to approximately several amperes by the gate circuit 52, rush current does not flow to the high voltage battery B, and the high voltage battery B can be protected.

With the present embodiment described above, advantages similar to those of the first embodiment can be anticipated.

Figure 11:
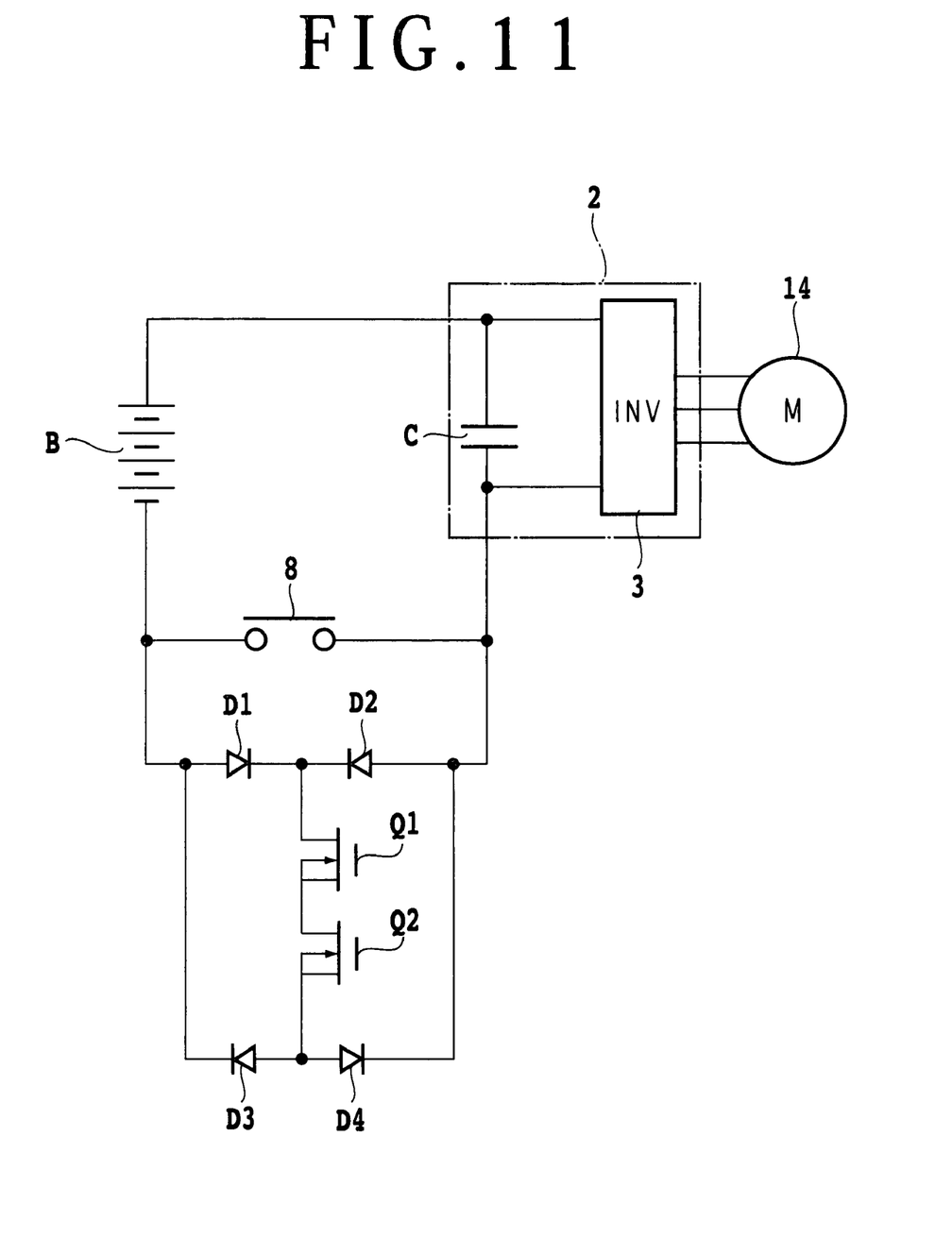
FIG. 11 is a block circuit diagram of a controlling apparatus for a motor vehicle of a modification of the present invention.

FIG. 11 is a view showing a controlling apparatus for a motor vehicle according to a modification of the present invention, and substantially same components as those shown in FIG. 1 are denoted by same reference characters. The present modification is different from the controlling apparatus for a motor vehicle in FIG. 1 in that, as a common switch element, an FET Q2 (common switch element) is provided in series to the FET Q1 between the first diode D1 and the fourth diode D4 and between the second diode D2 and the third diode D3. The FET Q2 is electrically connected at the drain thereof to the source of the FET Q1 and is electrically connected at the source thereof to the anodes of the third and fourth diodes D3 and D4.

It is to be noted that a gate circuit not shown having a configuration similar to that of the gate circuit 20 for controlling ON/OFF of the FET Q1 for controlling ON/OFF of the FET Q2 is provided. A further FET may be connected in series to the FETs Q1 and Q2.

While operations of charge and discharge of the controlling apparatus for a motor vehicle of FIG. 11 are similar to those in FIG. 1, even if one of the FETs Q1 and Q2, for example, the FET Q1, is in an ON failure (for example, upon adhesion of the FET Q1), since the FET Q2 operates ON/OFF normally, charge and discharge can be carried out normally, and a protection function in an ON failure state of the FET Q1 can be achieved.

Similarly, a plurality of FETs Q1 and Q2 (common switch elements) connected in series may be provided as a common switch element between the first diode D1 and the fourth diode D4 and between the second diode D2 and the third diode D3 in FIG. 8. At this time, a gate circuit not shown having a configuration similar to that of the gate circuit 52 for controlling ON/OFF of the FET Q2 is provided.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A controlling apparatus for a motor vehicle having a high voltage direct current power supply, an inverter for converting direct current power of said high voltage direct current power supply into ac power, a smoothing capacitor provided between said inverter and said high voltage direct current power supply, a main contactor provided between said high voltage direct current power supply and said smoothing capacitor for connecting and disconnecting said high voltage direct current power supply and said smoothing capacitor to and from each other, and a precharge circuit connected in parallel to said main contactor;

said precharge circuit including
a discharge path connected in parallel to said main contactor for passing discharge current from said smoothing capacitor to said high voltage direct current power supply from the negative electrode of said high voltage direct current power supply to the negative electrode of said smoothing capacitor or from the positive electrode of said smoothing capacitor to the positive electrode of said high voltage direct current power supply and a charge path connected in parallel to said main contactor for passing charge current from said high voltage direct current power supply to said smoothing capacitor from the negative electrode of said smoothing capacitor to the negative electrode of said high voltage direct current power supply or from the positive electrode of said high voltage direct current power supply to the positive electrode of said smoothing capacitor;

at least one common switch element being provided in said discharge path and said charge path.

2. The controlling apparatus for a motor vehicle according to claim 1, wherein a first diode electrically connected to one terminal of said main contactor for passing the discharge current and a fourth diode electrically connected to the other terminal of said main contactor for passing the discharge current are provided in said discharge path; and a second diode electrically connected to the other terminal of said main contractor for passing the charge current and a third diode electrically connected to the one terminal of said main contactor for passing the charge current are provided in said charge path;

the at least one common switch element being disposed between said first and fourth diodes and between said second and third diodes.

* * * * *